(12) United States Patent
Hassan-Ali et al.

(10) Patent No.: US 6,778,542 B1
(45) Date of Patent: Aug. 17, 2004

(54) BRIDGING NETWORK DEVICE WITH TIME WINDOWED DISCOVERY OF MACHINE ADDRESSES

(75) Inventors: Mudhafar Hassan-Ali, Rohnert Park, CA (US); Mark W. Cole, Santa Rosa, CA (US); Kevin A. Jaeger, Glen Ellen, CA (US)

(73) Assignee: Alcatel, Paris (FR)

( * ) Notice: Subject to any disclaimer, the term of this patent is extended or adjusted under 35 U.S.C. 154(b) by 792 days.

(21) Appl. No.: 09/735,270

(22) Filed: Dec. 11, 2000

(51) Int. Cl.[7] .............................................. H04L 12/56
(52) U.S. Cl. ...................... 370/401; 370/255; 370/402; 370/453; 370/254; 370/252
(58) Field of Search ................................ 370/229, 238, 370/241.1, 252, 254, 255, 257, 390, 393, 395.1, 395.52, 395.54, 395.6, 395.7, 401, 402, 420, 403, 405, 453, 457; 709/220, 222, 223, 253

(56) References Cited

U.S. PATENT DOCUMENTS

| | | | |
|---|---|---|---|
| 5,684,800 A | * 11/1997 | Dobbins et al. | ............ 370/401 |
| 6,115,376 A | * 9/2000 | Sherer et al. | ................ 370/389 |
| 6,430,188 B1 | * 8/2002 | Kadambi et al. | ............ 370/398 |
| 6,614,764 B1 | * 9/2003 | Rodeheffer et al. | ......... 370/254 |
| 6,657,991 B1 | * 12/2003 | Akgun et al. | ................ 370/352 |

* cited by examiner

Primary Examiner—Wellington Chin
Assistant Examiner—John Shew
(74) Attorney, Agent, or Firm—Craig A. Hoersten; V. Lawrence Sewell

(57) ABSTRACT

The present invention relates to an apparatus and a method for bridging of Ethernet frames between a subscriber LAN and the ATM network. In accordance with the invention a novel (time window discovery) method is used, with coordination of the network administrator and an access management system to provision a network bridging element or bridge with a set of provisioned devices authorized to forward data packets across the bridge. The bridge is allowed within a time window to learn machine-specific MAC addresses for the provisioned table. After the window is expired, or terminated by access management system, the bridge is switched back to learning mode to learn additional MAC addresses for a learned table in the traditional manner. The devices learned during the learning phase are not authorized to forward data packets across the bridge.

92 Claims, 6 Drawing Sheets

SFD = Start-frame delimiter ( 10101011)  DA = MAC Destination Address,
SA = MAC Source Address
FCS = Frame Check Sequence

BRIDGING NETWORK DEVICE WITH TIME WINDOWED DISCOVERY OF MACHINE ADDRESSES

FIELD OF THE INVENTION

The present invention relates generally to an apparatus and a method for detecting machine addresses in a bridged network environment, and for provisioning a bridging device for use in said environment.

BACKGROUND

Network interface devices are commonly used in large telecommunications and computer networks to provide an interface between two or more smaller subnetworks or subnets. Such interface devices include hardware and software bridges and routers. A bridge is a hardware or software-based network device with a local end and a remote end. The bridge is typically used to connect two disparate or geographically distant networks (a near end network and a far end network), or to divide up a larger network into smaller subnets for reasons of manageability and to minimize unnecessary data traffic throughout the entire network. When powered on, or initialized, the bridge searches for or otherwise determines all of the local machines and devices on its subnet, i.e. connected to its local end. Typically during the process the bridge creates a "learned table" which includes an entry for each machine on its local subnet. The learned table may be supplemented with a "provisioned table", which is typically a table of entries for machines on the local subnet that has been explicitly specified either by an operator or by a software program. The entries in the provisioned table are not usually detected or learned as are the entries in the learned table. Provisioned tables are most often used when security demands that only provisioned or authorized devices be allowed to use the bridge, or when it is desired that certain important devices may be added to the local subnet at a later stage, or in instances that certain devices on the local subnet may be intermittently turned off or removed. To ensure the bridge always know about these devices, a record is stored in the provisioned table.

In operation, both the learned table (if present) and the provisioned table (if present) are used to control the flow of traffic across the bridge. When the bridge receives a data packet on the local subnet which specifies a destination media access control address, it checks all of its machine tables to see if an entry exists for the destination machine to indicate the destination machine is also on the local subnet (i.e., connected to the local end of the bridge). If an entry exists the bridge does nothing further with the packet. If an entry does not exist the bridge sends the packet to its remote end. This process sends the packet across, for example, an electrical or optical cable to another, remote network. The bridge doesn't care whether the remote network exists, or whether the source machine is present there all it knows is that the source machine is not on its local subnet and that it should forward the data packet onwards.

Some bridge devices operate between disparate networks. In the context of this application disparate networks are those which operate on different protocols, for example one network may operate using ATM protocol while the other uses IP protocol. In this scenario the bridge may be incorporated into, or combined with, another device or devices which handle the translation from one protocol to another. An example of such a device is the Ethernet line unit (ELU) made by Alcatel USA, Plano, Tex. The ELU is itself typically incorporated into a Litespan Terminal Unit (LTU), also made by Alcatel USA. Together the LTU and ELU allow a subscriber network or LAN (such as a home or office) to connect to an ATM network and thereafter to other ATM devices, such as switches and routers.

When bridging Ethernet frames between a subscriber LAN and the ATM network, Ethernet bridges need to know which frames to ignore, because they are destined for another unit on the subscriber's LAN, and which frames to forward toward the ATM network, because they are destined for a unit not on the subscriber's LAN. Most bridges make this determination by examining the destination MAC address of the frame and comparing it to an internal table of MAC addresses known to be located on the LAN side of the bridge. In conventional bridges, the MAC address table can be built either manually (in which case someone pre-programs them into the table—a "provisioned" method), or automatically (by learning the MAC addresses from the source MAC address present in each Ethernet frame it detects—a "learning" method). Many bridges incorporate both a provisioned mac-address table (PMT) and a learned mac-address table (LMT).

Learned tables typically invalidate their entries after a predetermined time-out in order to self-adjust to changing hardware on the networks, so if a permanent entry is desired, it must be provisioned into the PMT. Typically, this provisioning is undertaken remotely by a central operator, or locally on-site by a field technician. The operator or technician must normally review a list of machines that are to be provisioned and enter them one-by-one into the PMT. The initial provisioning procedure is by itself time-consuming, and hence a very expensive process. In addition, the often repetitive nature of such a chore leads to errors in provisioning the table. A simple mis-keyed character can produce a PMT error that causes an entire LAN connection to fail. Such errors are often difficult to track down or locate, and can cause considerable network down-time. Furthermore, correcting then may require additional trips by the technician to the actual bridge site, which adds to the total cost of installing and maintaining the bridge and associated network.

SUMMARY OF THE INVENTION

In accordance with the present invention, roughly described, a network bridging element (NBE) is provided with a provisioned MAC-address table (PMT) that is provisioned using a novel time window discovery method, with coordination of the network administrator and an access management system. The network bridging element (NBE) may comprise a full bridge, a half-bridge, or any equivalent bridging or routing device. "Full" or "local" bridges are commonly defined as having two or more LAN ports and act as a bridge between two or more LAN's. "Half" or "remote" bridges have both a LAN and a WAN port and communicate with a counterpart bridge device via a WAN (such as an ATM network). When taken together the two matching half-bridges constitute a full bridge. In effect, the actual bridge may be considered to comprise the half-bridge on the local LAN plus the half-bridge on the remote LAN plus the wires (or leased lines) that connect them. In the context of this application an NBE may refer to either a full bridge, half-bridge, or an equivalent device, and the invention may be used in a similar fashion with any such device. As used herein the term access management system is used to describe a system or method used to configure network devices over a wide area network.

In one embodiment of the invention the bridge is allowed within a specified time period or time window to learn MAC addresses for a provisioned, as opposed to the learned, table. During this time window, the designated device, (which may for example be a standard Windows-based computer, a server system, or any equivalent network device) is powered on and made to send Ethernet frames, so that the bridge can learn the MAC address of the designated device. One way of achieving this is by using an Internet or TCP/IP command. Similarly a ping command (ICMP) can send a request to the bridge. Alternatively, the designated device can be turned from an "off" to an "on" setting while the window is active. Taking the example of a Windows domain this process may cause the computer to use for example the NetBEUI protocol to send Ethernet frames to discover a domain DHCP host. The bridge will then detect these Ethernet frames. Using any of these methods, or their equivalents, will allow the bridge to learn the computer's MAC address. After the window is expired, or terminated by the access management system, the bridge will be turned back to a regular learning mode to learn additional MAC addresses for the learned table in the traditional manner.

The present invention addresses the problems associated with manually provisioning a bridge device address table, and reduces the possibility of error in creating such a table. This leads to considerable reductions in time and cost spent on installing and maintaining distributed networks connected or in communication with each other via a bridge device.

In another embodiment the invention comprises a system and a method for creating a device address table or PMT that supports security features which prohibit un-provisioned or un-authorized devices on a distributed network from actually using or sending data via the bridge.

DETAILED DESCRIPTION

Figure 1:
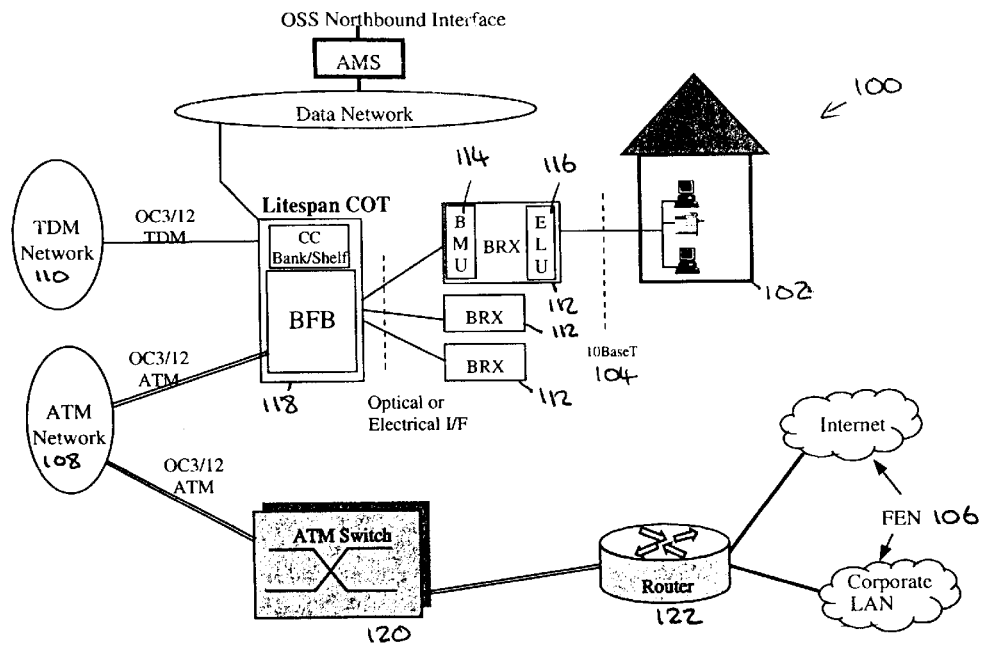
FIG. 1 shows a block diagram of a network incorporating the invention.
Figure 2:
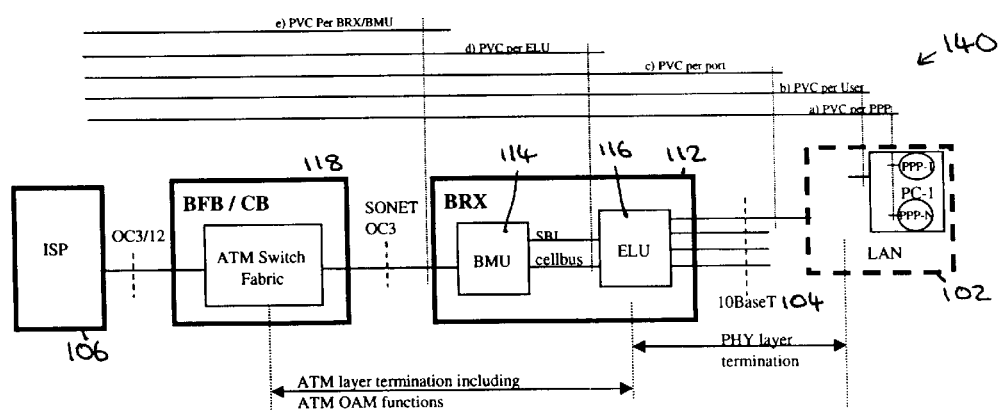
FIG. 2 shows a block diagram of the physical connection in the broadband Litespan/Ethernet unit in accordance with an embodiment of the invention.

FIG. 1 shows an example of a system incorporating the invention which further comprises an Ethernet link to a broadband Litespan unit. A private network 102 uses 10BaseT Ethernet medium 104 to carry traffic to a far end network 106. This external traffic is relayed to the ATM network 108 via a series of Litespan BRX/BFB Broadband products 112, 118. FIG. 2 shows the interface in further detail.

The ELU 116 is a Litespan network bridging element (NBE) line unit responsible for interfacing with the Ethernet LAN of a subscriber. As described herein a NBE may comprise a full bridge, a half-bridge, or an equivalent bridging device. "Full" or "local" bridges are commonly defined as having two or more LAN ports and act as a bridge between tow or more LAN's. "Half" or "remote" bridges have both a LAN and a WAN port and communicate with a counterpart bridge device via a WAN such as an ATM network. Together the two matching half-bridges constitute a full bridge. In effect, the bridge may be considered to comprise the half-bridge on the local LAN, the half-bridge on the remote LAN, and the wires or leased lines that connect them. In the context of this application a BNE may refer to either a full bridge, a half-bridge, or an equivalent device, and the invention may be used in a similar fashion with any of these devices. In one embodiment the ELU may operate in either a bridge or a half-bridge mode. The ELU is installed in a small network unit known as Broadband Transceiver (BRX). The ELU receives the Ethernet frames, converts them into ATM cells, and finally sends them to the ATM network via a broadband multiplex unit (BMU) 114 and a broadband fiber bank BFB 118. At the destination, the ATM cells are assembled into either Ethernet frames or Internet Protocol (IP) packets, depending upon whether the terminating device is a bridge or a router. In the reverse direction, the ELU receives the ATM cells, converts them into Ethernet frames, and transmits them to the subscriber's Ethernet network.

Hardware Architecture

In the BRX, the ELU interfaces with a variety of busses including the subscriber bus interface (SBI) and the cell bus:

The SBI is a single-bit full-duplex bus and carries a data link to support Litespan legacy traffic. The data link is used to provision the line unit and can be used to download available system-readable software. Two SBI buses per line unit, herein referred to as SBI-A and SBI-B, connect continuously to both an Active and a Standby BMU.

The cellbus carries the Broadband traffic, and in one embodiment includes two groups of eight-bit buses. The downstream bus, from the BMU to the line unit, is broadcast to all line units via four downstream buses. Hence, the ELU should be provisioned to all Virtual Circuit Identifier/Virtual Path Identifier (VCI/VPI) addresses that are assigned to it. The upstream bus, on the other hand, is statistically time-multiplexed. Each Ethernet port in each ELU can act as an interface to a remote or far-end network or subnetwork, which may for example be a customer 10 BaseT Ethernet LAN.

Figure 3:
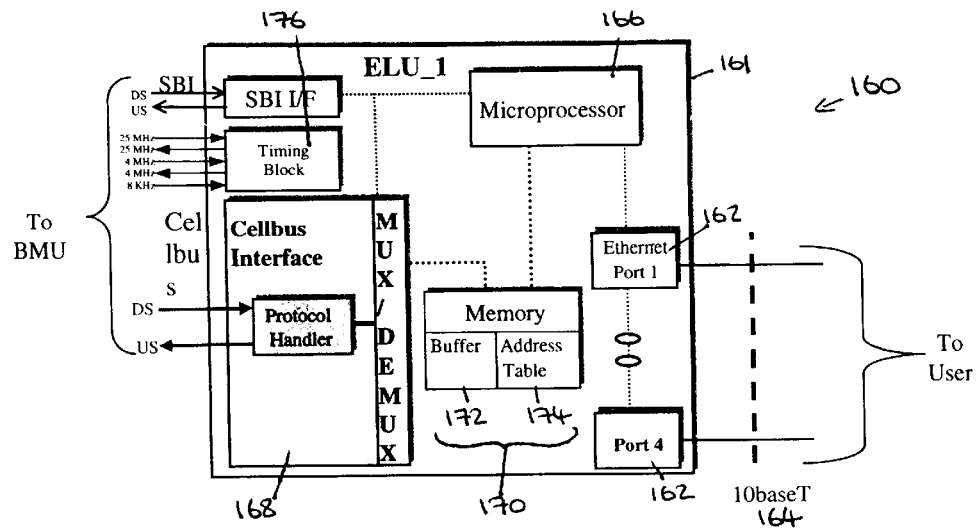
FIG. 3 shows the ELU hardware architecture in accordance with an embodiment of the invention.

In one embodiment as shown in FIG. 3, the ELU 161 has the following components:

A plurality of 10 BaseT Ethernet transceivers 162;

A microprocessor 166 with fast logic for computationally intensive operations related to protocol implementation, such as cyclic redundancy check calculation, table look-up, etc.;

A cellbus interface 168;

Memory, (RAM and Flash) 170. RAM memory is used to store programs under execution and for buffering various packet data unit's 172, such as Ethernet frames and ATM cells. The memory is also used for storing all protocol-related addresses 174, such as the media access control (MAC) address, IP, Virtual Circuit Identifier, and Virtual Path Identifier addresses. Flash memory is used for codes and protocol implementation; and, A timing block to control the backplane clocks 176.

Figure 4:
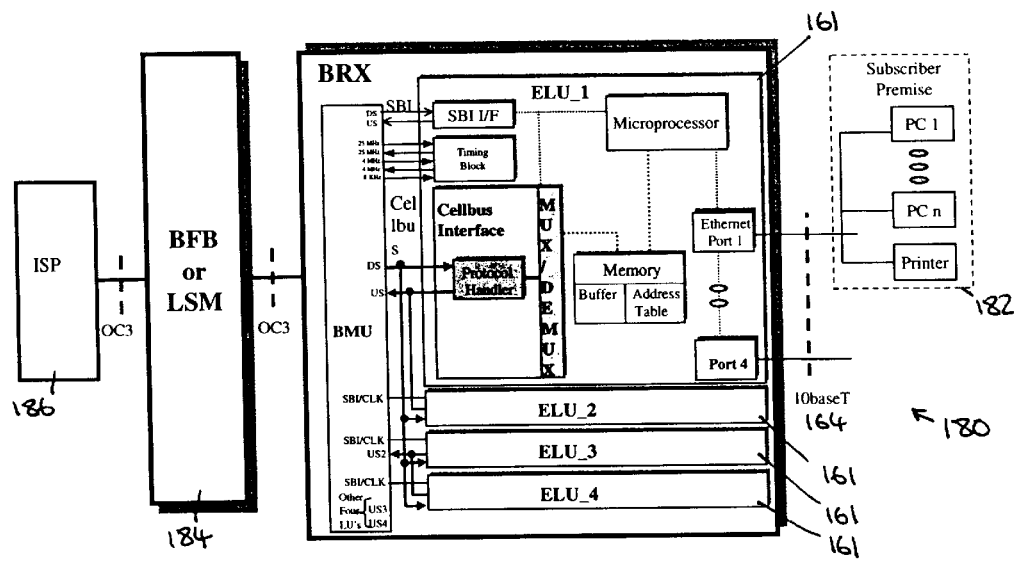
FIG. 4 shows the arrangement of ELU's in a BRX unit in accordance with an embodiment of the invention.

FIG. 4 illustrates one embodiment of the BRX/ELU architecture. In the embodiment shown each BRX may include four ELU cards 161. These cards can be plugged into any one of eight available slots. As shown in FIG. 4, they share the same downstream cellbus, and the Downstream and Upstream cellbuses are connected via a process handler.

Protocols

Many protocol encapsulation techniques exist for transporting the Ethernet payload over an ATM backbone. These include LLC/SNAP, with encapsulation per Request for Comments RFC 1483, herein incorporated by reference, which has been implemented in third party routers, such as those built by Cisco Corporation; and the Point-to-Point Protocol over Ethernet (PPPoE), with encapsulation per RFC 2516, also incorporated by reference herein.

Figure 5:
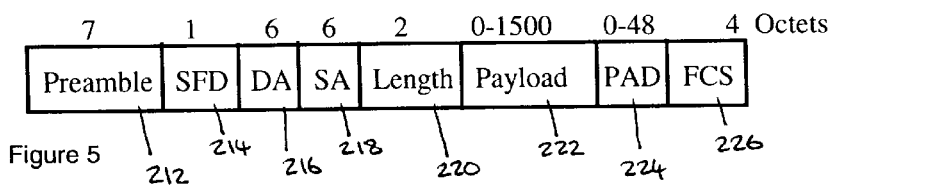
FIG. 5 shows the format of an Ethernet packet.

Ethernet is a medium-access protocol, which enables multiple users to share the same physical medium, such as twisted-pair cables or coaxial cables. It includes the MAC layer, which specifies the method for source and destination addressing to be used for exchanging packets between users connected to the same network. The format of a typical Ethernet packet or frame is shown in FIG. 5.

By default, every Ethernet network interface device (commonly called a "NIC") listens to the medium that is connected to. There exists two possible scenarios that can occur each time a NIC sends or receives data via Ethernet:

1. The NIC receives data via the transmission medium from another NIC. In this scenario, the receiving NIC looks at the destination address, and then:
   If it matches it's own MAC address, then it accepts the data,
   Otherwise (if it doesn't match) it discards the data (or more correctly ignores it).
2. The NIC has data to send to another device via the transmission medium. In this scenario, the sending NIC must first know the Ethernet address or MAC address of the destination device. It then follows these steps for accessing the medium:
   Sense the medium, then:
      If another device is using the medium, then the device waits and does not transmit, and
      If there is no activity, i.e. if the medium is idle, then the device starts transmitting.
   During transmitting, the sending NIC listens to what it has transmitted to see:
      If it matches, then continue transmitting, and
      If it does not match, i.e. a network collision has occurred due to, for example, two or more users/devices transmitting simultaneously, the NIC stops transmitting, waits for an amount of time, and then retries the transmission.

Generally, the overall network performance is dependent on the number of collisions (re-transmissions), which is itself a function of the utilization of the medium, and how soon the collision can be detected. This latter aspect is a function of the propagation delay in the medium.

ATM Encapsulation

In accordance with one embodiment of the invention, the ELU performs two main functions as an NBE: the first function being to act as a learning half-bridge, and the second function being to allow segmentation of subscriber Ethernet frames into ATM cells. In accordance with this embodiment of the invention the cells flow to a router equipped with integrated bridging/routing. There the cells are first reassembled into Ethernet frames, and then internally transferred to a routing engine where IP datagrams are extracted and routed. RFC 1483 (now RFC 2896), herein incorporated by reference, describes two encapsulation methods for carrying network interconnect traffic over a single ATM virtual circuit, or a separate ATM virtual circuit. Each of these methods can be either bridged or routed, i.e. the ELU can act as a bridge (or more correctly a half bridge since it is bridging on one side, the subscriber side only), or as a router.

Figure 6:
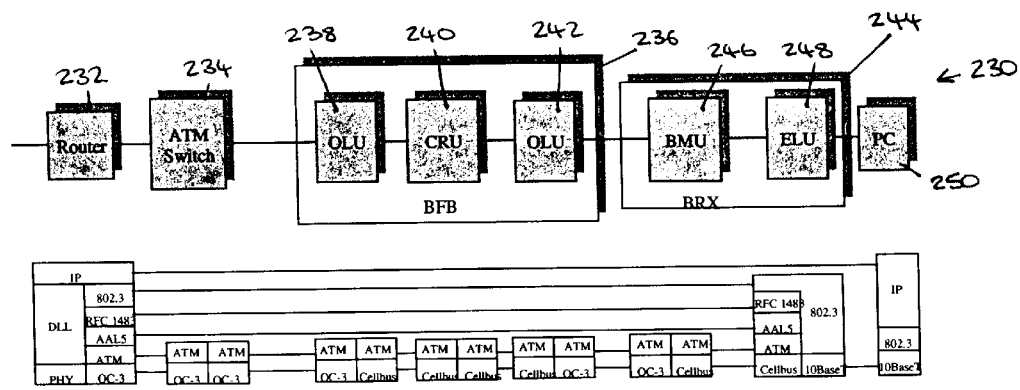
FIG. 6 shows the ATM encapsulation.

FIG. 6 shows a schematic of a system which incorporates the invention as an NBE bridging device between a user's Ethernet network and an ATM network. The data payload carried by the bridge, often called packet data units, or Ethernet frames, is carried in the payload field of the common part convergence sublayer (CPCS) packet data unit of the ATM adaptation layer (AAL). The PID indicates whether the FCS bytes are included in the encapsulation; i.e. if PID=1 then don't include FCS, and if PID=7 then include FCS. The ELU is so designed that it can deal with both cases.

Figure 7:
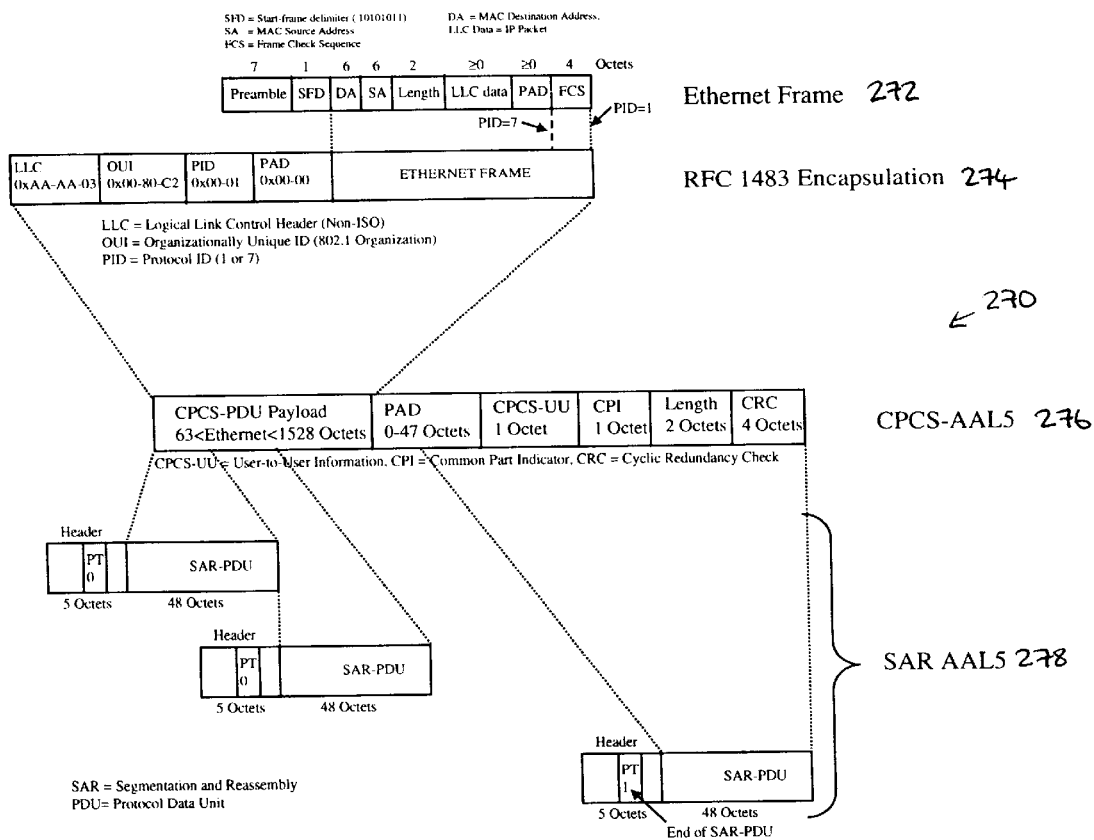
FIG. 7 shows the framing in the LLC bridge in accordance with an embodiment of the invention.

The format of the AAL CPCS packet data unit is shown in FIG. 7. In addition to appending some fields to the trailer of the CPCS AAL packet data unit, a cyclic redundancy check field is included.

The PAD field pads the CPCS-packet data unit to fit exactly into the ATM cells such that the last 48-octet cell payload created by the SAR sublayer will have the CPCS-packet data unit trailer right-justified in the cell.

The CPCS-UU (User-to-User indication) field is used to transparently transfer CPCS user to user information.

The CPI (Common Part Indicator) field aligns the CPCS-packet data unit trailer to 64 bits. The cyclic redundancy check field protects the entire CPCS-packet data unit except the cyclic redundancy check field itself.

After constructing a CPSC-packet data unit, a segmentation function is performed. The length of the whole packet data unit is an integer multiple of 48 octets. The payload type indicator (PTI) is set to 1 only in the last ATM cell constructed from the CPSC-packet data unit.

Figure 8:
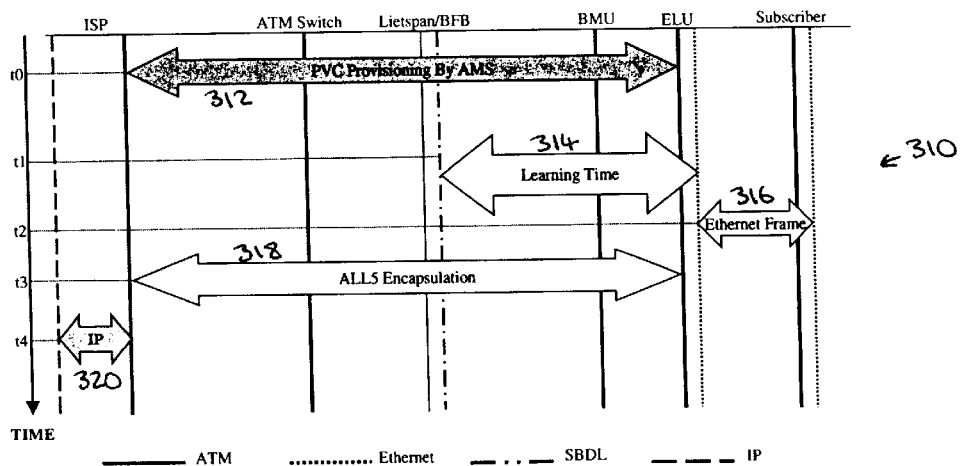
FIG. 8 shows the timing of the LLC link in accordance with an embodiment of the invention.

The timing of the LCC/SNAP link is illustrated in FIG. 8. As shown therein the link undergoes several steps:

1. An ATM PVC connection is set up though out the whole network; i.e. the VCI/VPI's inside the Litespan system (BRX/BFB) via, additionally, the ATM switch and the router ports.
2. Each authorized user attached to the ELU, is provided with the server IP address of the remote network; an ISP or a private LAN. The assumption is the remote network supports RFC 1483.
3. The learning phase will take place when the ELU is configured to be a learning bridge. However, the software supports being told how many MAC addresses it can store in its cache, and other provisioning parameters.
4. When a station has a packet to send out of the local network, it uses the ISP server IP address.

Bridging and Filtering

In accordance with one embodiment of the invention, the ELU can operate in one of two modes which determine whether it operates either as a bridge or as a half bridge. These modes are referred to herein as Learning Half Bridge Mode and Provisioned Bridge Mode.

Learning Half Bridge Mode

In this mode of operation, the ELU converts the Ethernet frames into ATM cells in the upstream direction. The only Ethernet frames admitted for conversion and transmission are the ones that have destination MAC address that are not in the ELU address cache. This address cache is a table of all MAC addresses, i.e. a MAC table (MT), for the devices attached the Ethernet port. There may be different MAC tables for each ELU, and a further one for each port of that ELU.

The ELU port learns the MAC addresses of the local area network (LAN) connected to it by looking at the source address field of the Ethernet frames received from the LAN. If the source address field in the frame is not already included in the MT it is added, and the source thereafter becomes a member of the Ethernet local network. The ELU forwards frames upstream when the MAC destination address can not be found in the MT of that port.

The learning bridge function is based on the source MAC address, while the upstream filtering function is based on the destination MAC address. These two functions operate together so as to avoid the bridging of local traffic and the flooding of the backbone network or router. The MAC addresses thus learned are used to determine whether or not to forward an Ethernet packet to the network (i.e. to forward the packet off-LAN) according to the algorithm shown in Listing 1:

a) Check Source Address (Source Address) in the MAC table, then
    if Source Address does not exist, then
    learn it into MT
    associate an aging timer with it,
    exit
    else if Source Address exists, then
    reset its aging timer
    go to the next step,
b) Check Destination Address (Destination Address) in the MT, then
    if Destination Address exists, then
    discard frame
    otherwise forward frame to network.

Listing 1

The rules for learning and aging MAC addresses, and for forwarding an Ethernet frame off LAN are summarized in Table 1. An aging timer is associated with each MAC address in the table. When the timer expires or times out, the MAC address associated with it is removed from the MAC table. The time for aging a MAC address may be selected or provisionable to be either in a range from 1 to $2^{16}$ seconds, or of infinite duration.

An aging timer is associated with each MAC address in the table. When the timer expires or times out, the MAC address associated with it is removed from the MAC table. The time for aging a MAC address may be selected or provisionable to be either in a range from 1 to $2^{16}$ seconds, or of infinite duration.

There may be occasions when the MAC table is full, and no longer accepts MAC address to learn. This may occur when the aging time is set as infinite, since the ELU will keep putting MAC addresses in the MAC table without removing any. One solution to this problem is to discard the oldest MAC address in the MT. The aging time unit is specified as a second of time. The aging timer used for most devices equipped with an Ethernet NIC, such as personal computers (PC's), is typically set to several tens of minutes, for example 30, 90, or 300 minutes.

TABLE 1

| When received Ethernet frame header has: | Broadcast (during ARP) | Unicast |
|---|---|---|
| Source address in MT | Reset learning/aging timer | Reset learning/aging timer |
| Destination address in MT | No forward | Discard frame |
| Source address in | Reset learning/aging timer | Reset |

TABLE 1-continued

| When received Ethernet frame header has: | Broadcast (during ARP) | Unicast |
|---|---|---|
| MT | | learning/aging timer |
| Destination address not in MT | Forward frame | Forward frame |
| Source address not in MT | Learn source | Learn source |
| Destination address in MT | No forward | Discard frame |
| Source address not in MT | Learn source | Learn source |
| Destination address not in MT | Forward frame | Forward frame |

Provisioned Bridge Mode

In this mode of operation, two logical MAC tables are maintained, a provisioned MAC address table (PMT) and a learned MAC address table (LMT). In this manner, and in a novel application of the invention, the Ethernet port of an ELU is provided with a method to authorize only certain (i.e. provisioned) devices, such as a computer server attached to the LAN, to actually send frames off-LAN. Other (i.e. non-provisioned or learned) devices are not allowed to send Ethernet frames off-LAN. It will be evident that although two logical tables are maintained they may be stored in a common table structure or block of memory. If this method is used, then the entries corresponding to each logical table can be differentiated by having different associated PMT or LMT variables, or by the presence (or absence) of flags indicating that they are either PMT or LMT entries. For example, a single table could be used wherein the PMT and LMT entries contained therein each certain a valid MAC address for an association network device but whereas the LMT entries contain a valid expiration timer, the PMT entries have the timer set to zero (0) or FF to denote them special status as provisioned addresses, and ensure they are not expired.

In accordance with one embodiment of the invention the PMT is used to store all the MAC addresses of the devices that are provisioned and hence authorized to send frames off LAN, whereas the LMT is used to store the MAC addresses of other devices that are later learned and not authorized to send frames off LAN.

In order to provision these two MAC Tables, the Ethernet port is configured in a two-phase process. First, the permanent or provisioned MAC addresses are determined and stored in the PMT. This amounts to building a list of authorized machines. Second, the other MAC addresses are learned and stored in the LMT. These two phases, provisioning phase and learning phase, are explained in detail below:

TABLE 1a

| Entry | MAC address | Timer | Recognized As |
|---|---|---|---|
| 1 | 00:C0:F0:20:18:AD | 24 | LMT |
| 2 | 00:60:B0:58:BB:91 | 12 | LMT |
| 3 | 00:65:C0:18:14:F1 | 0 | PMT |

Provisioning Phase

As a provisioned bridge, the ELU will forward the Ethernet frames upstream only if the Destination MAC Address is not in the PMT or the LMT. There are two methods to provision the MAC addresses:

Access Management System MAC Address Provisioning, and

Time Window Discovery Provisioning.

Access Management System MAC Address Provisioning

In this method, the network administrator uses the access management system to enter the MAC addresses for each port. This is similar to traditional methods in that the subscriber must contact the network operator or access management system, and provide the pertinent MAC addresses. Much time is spent in communicating and entering the MAC addresses, and in verifying they are in fact valid addresses for the ELU port being configured. In addition, the often repetitive nature of the task leads to errors in provisioning the table. Such errors can force additional trips by the technician to the work site (i.e. the site where the ELU is located, or the customers/subscribers subnetwork location).

Time-window Discovery Provisioning

Figure 9:
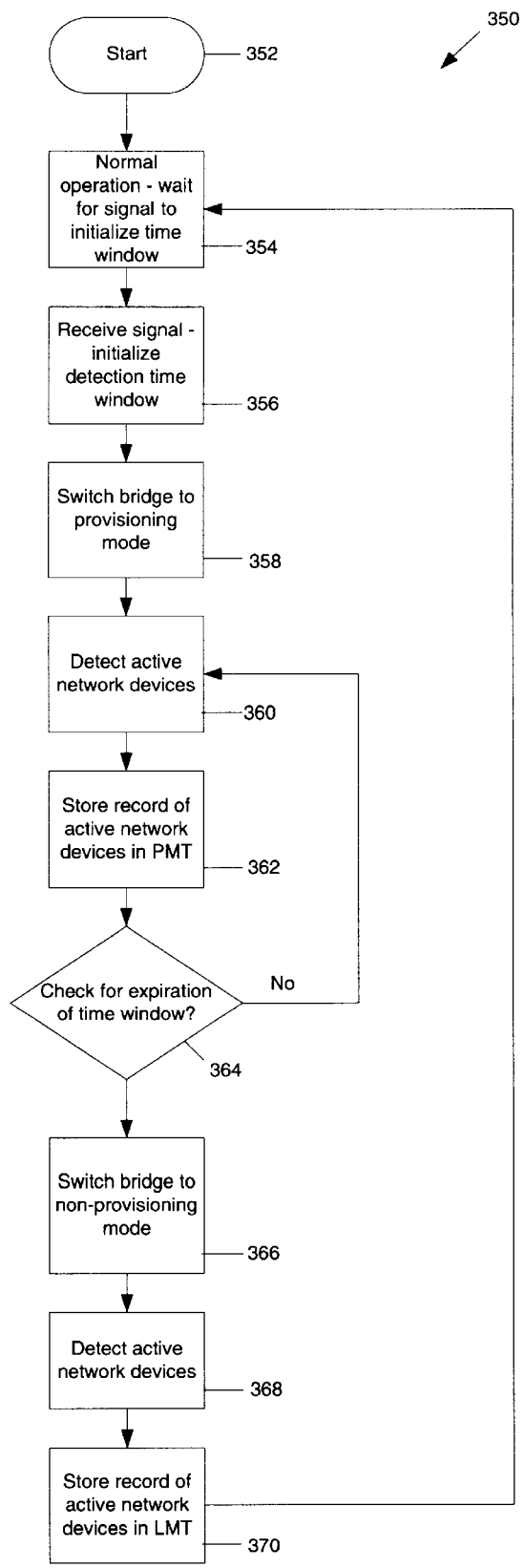
FIG. 9 shows a flowchart of a method in accordance with an embodiment of the invention.

FIG. 9 shows a flow chart of a time-window discovery method in accordance with the present invention. In this novel method provided by the invention, coordination of the network administrator and access management system causes the ELU port to be made to operate in a discovery mode, and allowed to learn MAC addresses for the PMT within a specified time period. During this time period or time window, the designated device, which may be a windows-based computer, such as a server, a network device, or an equivalent device) is powered on and made to send Ethernet frames, so that the ELU port learns the MAC address of the designated device. In one embodiment of the invention this is achieved by using an Internet command such as a ping command to force a response from the designated device. Alternatively, the designated device can be powered on while the time window is active. Using the example of a standard Windows domain network, a powered-on computer can be set to use netBEUI or a similar protocol to send Ethernet frames to discover a domain DHCP host during a DHCP boot procedure. This process allows the ELU port to learn the MAC address of the device.

After the window has expired, or is terminated by the Access Management System, that ELU port is turned back to a learning mode, to continue learning MAC addresses, this time however for the LMT.

It is possible to allow both provisioning methods to coexist, e.g. if an ELU port is initially provisioned using the time-window method, it is possible for the Access Management System to issue a command to add or delete MAC address from the PMT created during the time window. Alternatively the AMS can add or delete addresses from the PMT, and time-window discovery can be used afterwards to add additional addresses.

Secure Runtime Phase

When the MAC address-provisioning phase is completed, the PMT will have stored a list of all the MAC addresses detected and considered as provisioned devices. In one embodiment of the invention that provides for secure provisioning these devices (MAC addresses) are the only ones allowed to send Ethernet frames off LAN. Subsequently, the ELU is then switched to a runtime phase. In the runtime phase, the ELU learns MAC addresses, a record of which is stored in the LMT. When secure provisioning is enabled, these MAC addresses are not allowed to send frames off LAN.

Upstream Traffic

Figure 10:
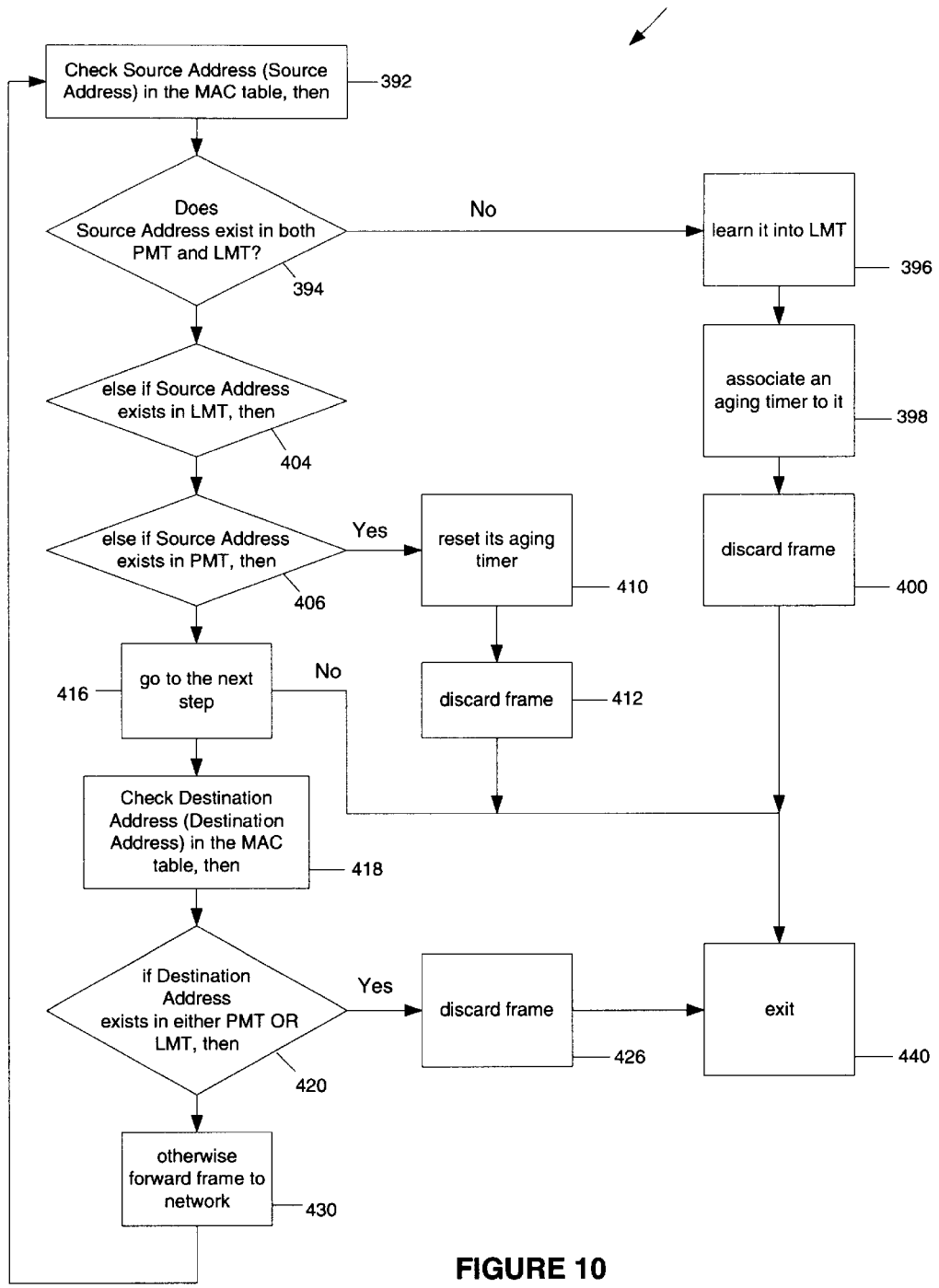
FIG. 10 shows a flowchart of a method in accordance with an embodiment of the invention.

When an Ethernet frame intended for upstream transmission is taken from the ELU's frame buffer, an algorithm such as that in Listing 2, and illustrated in FIG. 10, is used for referencing the PMT and LMT.

a) Check Source Address (Source Address) in the MAC table, then if Source Address does not exist in both PMT and LMT, then learn it into LMT
associate a aging timer to it
discard frame
exit
else if Source Address exists in LMT, then
reset its aging timer
discard frame
exit
else if Source Address exists in PMT, then
go to the next step b) Check Destination Address (Destination Address) in the MAC table, then
if Destination Address exists in either PMT OR LMT, then
discard frame
exit
otherwise forward frame to network.

Listing 2

Downstream Traffic

In the offsite transmission direction, the basic rule when handling downstream traffic is to forward the frame to the correct port if the destination address can be found in the PMT, otherwise the frame is discarded. One example of an algorithm used to accomplish this is shown in Listing 3.

As illustrated in Listing 3, the source address is not checked in the MAC table, and, therefore, there is no MAC address learning. Furthermore, when a broadcast frame (i.e. one in which the destination address is FFFFFFFFFFFF) is received, the ELU forwards it to the port. The rules for learning and aging MAC address, and for forwarding an Ethernet frame off LAN depending on whether the traffic is in the upstream or downstream direction, are summarized in Table 2.

Check Destination Address (Destination Address) in the MAC table, then
if Destination Address exists in PMT or Destination Address equals 0xFFFFFFFFFFFF, then
forward frame
exit
else
discard frame
exit Listing 3

As mentioned above, after specifying the ELU to operate in one of the modes of operation (i.e. discovery mode or learning mode), it is possible to subsequently issue a command to change the mode of operation from one to the other. Upon changing the mode of operation, the ELU can invalidate or clear the MAC address table (or tables). In one embodiment the ELU detects the change in the mode of operation by comparing its original mode of operation to the new one, and if a change is detected, the ELU resets itself to purge the MAC table.

TABLE 2

| When Received | Upstream | | Downstream | |
|---|---|---|---|---|
| Ethernet frame header has: | Broadcast (during ARP) | Unicast | Broadcast (during ARP) | Unicast |
| Source address in PMT | | Discard frame | | Source address is don't care |
| Destination address in PMT | | | | NA 1 |

TABLE 2-continued

| When Received Ethernet frame header has: | Upstream (during ARP) | Upstream Unicast | Downstream (during ARP) | Downstream Unicast |
|---|---|---|---|---|
| Source address in PMT | | Discard frame | Source address is don't care | |
| Destination address in LMT | | | NA | 0 |
| Source address in PMT | Forward frame | Discard frame | Source address is don't care | |
| Destination address not in PMT and LMT | | | 1 | 0 |
| Source address in LMT | Reset learning/ aging timer | Forward frame | Source address is don't care | |
| Destination address in PMT | | | NA | 1 |
| Source address in LMT | Reset learning/ aging timer | Reset learning/ aging timer | Source address is don't care | |
| Destination address in LMT | | Discard frame | NA | 0 |
| Source address in LMT | Reset learning/ aging timer | Reset learning/ aging timer | Source address is don't care | |
| Destination address not in PMT and LMT | Discard frame | Discard frame | 1 | 0 |
| Source address not in PMT and LMT | Learn source address | Learn source address | Source address is don't care | |
| Destination address in PMT | | | | 1 |
| Source address not in PMT and LMT | Learn source address | Learn source address | Source address is don't care | |
| Destination address in LMT | | | NA | 0 |

Non-secure Runtime Phase

It will be evident that the time-window discovery method described above can also be used in a non-secure mode, whereby the NBE (the ELU, bridge, or half-bridge) simply learns machine addresses for a PMT (to assist in the provisioning process), and whereby both the PMT and the LMT devices are allowed to send packets upstream. It will be further evident that while in the embodiment described, the PMT and LMT are described in terms of being separate elements they may be stored in a common area of memory or in a common table. The entries of one table can be distinguished from those of the other by flags, or by other means.

ELU Architecture

In accordance with one embodiment of the invention the ELU line card provides the central office side termination of four Ethernet facilities. Compatible equipment at the customer premises is necessary to terminate the Ethernet facility on the remote side of the facility. This equipment is typically a 10 Base-T Ethernet adapter or a hub device.

The Ethernet line cards have a single microprocessor. The microprocessor controls the Ethernet line and handles communications. When the microprocessor is first initialized, it executes a bootcode program which bootstraps operational software for the card. Once downloaded into RAM and verified for integrity, operational software execution begins.

Provisioning parameters, performance monitoring and condition records may be used with the Ethernet line unit. From a performance monitoring and alarm surveillance standpoint, there is a fixed relationship between the upstream path and the near-end, and between the downstream path and the far-end. This is because the upstream path is received by the near-end, and the downstream path is received by the far-end. The ELU supports standard ATM operation and maintenance (OAM) functions for loopback testing and performance monitoring.

TL1 Provisioning Requirements

Management protocol commands, such as the Transaction Language 1(TL1) commands specified by Telecordia Technologies Inc., may be used to communicate information to/from compatible network devices. Equipment-level TL1 commands are used to support and configure the ELU, some of which are shown in Table 3. When inputting a TL1 command, the Assembly Identification (AID) for ELU equipment takes the form:

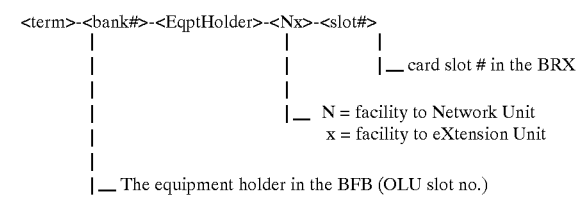

For example: ENT-EQPT::RT-5-3-N1 -3

When inputting a TL1 command, the AID for ELU facility takes the form:

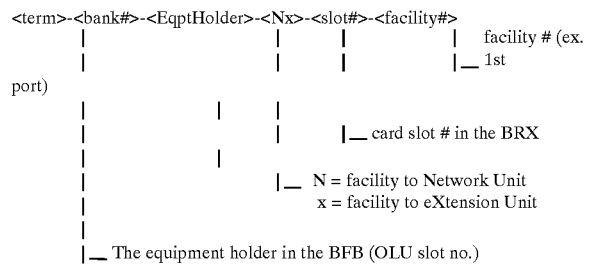

For example: ENT-ETHERNET::RT-5-3-N1 -3-1

A single database slot record is used both for provisioning and for state data structures within the Litespan intended for the ELU. The ELU occupies a single Litespan BRX channel bank slot, which may be either assigned or unassigned.

Ethernet Facility

When considering an Ethernet facility, the Ethernet drop is a single entity. An Ethernet facility is made up of two data channels: an upstream data channel and a downstream data channel.

The TL1 commands used to support Ethernet facility provisioning include, DLT-ETHERNET, ED-ETHERNET, ENT-ETHERNET, RTRV-ETHERNET, DLT-MAC, ENT-MAC, RTRV-MAC. They are similar to commands used for provisioning other facilities, e.g. T1, with the exception of some specific provisioning parameters, detailed in Table 3. Table 3 lists for the ETHERNET Command a variety of valid values and defaults. As shown therein:

The MODE option allows the bridge device to be set in learned (0), provisioned (1) bridge, or PPPoE mode. In provisioned bridge mode, frames having destination MAC addresses that are not in the provisioned table are not allowed to enter or leave the local LAN. In learned bridge mode, all learned MAC addresses can enter and leave the local LAN. For PPPoE, there is a direct secure PPP connection to the destination.

The DATARATE defines the data rate for the Ethernet facility. The access management system will provision the ELU with the specified bandwidth. The ELU buffers bursty traffic. Packet discard may occur if the buffer is full or the cyclic redundancy check does not match. The cell shaping or traffic shaping is performed by the pacing register in the ECPF FPGA. The ATM switches and the router ATM port are required to set up a UBR for Ethernet traffic.

The Virtual Circuit Identifier/Virtual Path Identifier Pair Assignments (Virtual Path Identifier and Virtual Circuit IdentifierMIN/Virtual Circuit IdentifierMAX) allows a provisioned number of Virtual Path Identifier/Virtual Circuit Identifiers per facility on the ELU. Virtual Circuit Identifier/Virtual Path Identifier Pair Assignments And Number Of Connection Per Port, the default values of the Virtual Path Identifier and Virtual Circuit Identifier that will be assigned to the ATM connection is dependent on the protocol. Virtual Path Identifier valid values will be 0 and 1 (default is 0). The Virtual Circuit IdentifierMIN/Virtual Circuit IdentifierMAX assignment is a range. Since the first 32 Virtual Circuit Identifiers are reserved for ATM management and forum, valid ranges for each port are 32 for min and max for bridging and 32 to 40 for PPPoE. The access management system must note these subtleties in provisioning the cross connect matrix for the ELU and the switching fabric.

The ATM OAM, allows loopback and performance monitoring features for the ELU via ATM. The ELU supports F5 flows and F4 flows when it originates/terminates VP's. The parameter OAMF4F5 enables or disables the F4 and F5 processing. The OAM ID is the default ID specified for an endpoint.

The Number of MAC Address and MAC Timeout entries (NUMMACENTRY, MACTIMEOUT) specifies the number of MAC address to be stored in the CAM. A timeout is associated with each MAC address.

The Learn MAC Address Window (LEARNMAC) specifies a time window in which the MAC addresses that have to be provisioned via a window are detected. The addresses can be learned with a predetermined timeout window or with a TL1 command that specifically opens the window and closes the window.

The MAC Address (MACADDR) specifies the MAC addresses that have to be provisioned using the TL1 command ENT-MAC. This parameter is a 6 byte hexadecimal value entered in the format xx xx xx xx xx xx.

If the Virtual Circuit IdentifierMin and Virtual Circuit IdentifierMax are not the same for bridging, there will be an error condition. There is only one Virtual Circuit Identifier for bridging.

The TL1 commands that support Ethernet facility status include RTRV-STATUS-ETHERNET. The output reports information pertaining to the ELU facility. Status monitored on the Ethernet facility includes the frame rates and ATM cell rates.

The TL1 commands that support general Ethernet facility maintenance include RMV-ETHERNET, RST-ETHERNET, ALW-MSG-ETHERNET, and INH-MSG-ETHERNET. They are similar to such commands for other facilities, e.g. T1. Loopback testing of the Ethernet facility on the MAC or physical layer is supported. The source and destination address are reversed so as to create a MAC layer loopback. This is associated with a separate TL1 Command—OPR-LPBK-ETHERNET.

TABLE 3

| Parameter | Description | Learning Bridge | Provisioned Bridge | PPPoE |
|---|---|---|---|---|
| MODE | Learned (0) or Provisioned (1) or PPPoE(2) | 0 | 1-default | 2 |
| DATARATE | Provisioned data rate (kbps) | ~2000 kbps for bridging | | |
| Virtual Path Identifier | Valid Virtual Path Identifier value | 0, 1 default 0 | | 0 |
| Virtual Circuit Identifier MIN, Virtual Circuit Identifier MAX | Valid Virtual Circuit Identifier ranges | default Virtual Circuit IdentifierMIN: 32 default Virtual Circuit IdentifierMAX: 32 | | 32–40 8 per port(VP) |
| OAMF4F5 | Enables F4 and F5 ATM OAM processing | 0,1 default 0 | | |
| NUMMAC ENTRY | Number of MAC Entries | 256 | 1-32, remainder are learned default 4 | N/A |
| MACTIME OUT | Expiration time of MAC Entries (in minutes) | 1–65535, 0 never expires default 20 | | N/A |
| LEARN MAC | Opens a window to learn MAC addresses | N/A | 255 - opens the learning window 0 - closes the learning window 1–254 - opens the learning window with specified timeout (in minutes) | N/A |
| MACADDR | MAC Address to be provisioned N/A | 6 byte hex value | | N/A |

Bridging Software

The bridging software comprises a Packet Processing Module.

Listing 4 shows a sample code for upstream processing.

```
UpstreamProcessing ()
{
Do forever {
If no packets {
Sleep for 1ms.
} else {
Process next packet P (may apply upstream scheduling algorithm
among SCCn).
Get P from USBn[USBnHead] with information at
USBnInfo[USBnInfoHead].
Check P for packet sanity (status bits in Control&Status).
If P's source port is configured for PPPoE/PPPoATM {
Call PPPoE/PPPoATM Routing function.
```

-continued

```
} else {
Call Bridging function.
}
For all cells in P {
Call CBusTxReady().
Write the next cell to the ECPF.
}
Increment USBnHead to point to the next packet in USBn.
Increment USBnInfoHead to point to the next entry in USBnInfo.
If SCCn Reception was disabled re-enable SCCn Reception.
}
}
}
```

Listing 4

Listing 5 shows a sample code for downstream processing.

```
DownstreamProcessing ()
{
Do forever {
Wait on SemCBusRx (check...sleep/no sleep).
(Wakeup getting SemCBusRx semaphore) set SemCBusRx to 0.
CellTransferLoop: While ECPFrxBufferLevelReg is non-zero {
Read cell tag.
If no more cell buffer available {
/* May want to discard the cell. */
Terminate the loop.
} else {
Transfer the cell from the ECPF receive cell buffer to a DSB
cell buffer.
If it is the end of an AAL5 frame queue the frame to
DSBnAAL5Tail.
}
}
If there are packet(s) to be process {
Process next packet P (may apply downstream scheduling algorithm
among SCCn).
Get P from DSBnAAL5Head.
Check packet sanity for P.
If P's source port is configured for PPPoE/PPPoATM {
Call PPPoE/PPPoATM Routing function.
} else {
Call Bridging function.
}
Queue P for Ethernet transmission.
Advance DSBnAAL5Head.
Goto CellTransferLoop.
} else {
Clear RXR flag in ECPFinterruptMaskReg to unmask Cell Bus RXR
interrupt.
}
}
}
```

The ELU bridging function is performed by two functions or tasks, a Make_bridging_decision task and a Maintain_CAM task. The Make_bridging_decision task is performed every time an Ethernet packet arrives. It is designed to complete its task using the fewest possible instructions and bus cycles. The Maintain_CAM task runs at lower priority and can be invoked when the traffic load is light. It's duty cycle comprises a single enqueued (source address, port) pair. The Maintain_CAM task can release control at the end of any cycle.

Make_bridging_decision

The Make_bridging decision function decides whether or not to send a received Ethernet packet upstream. The decision about whether or not to send a received packet upstream is made with the help of a special ELU Content Addressable Memory (CAM). For immediate received packet processing this CAM contains all of the source addresses, and only these addresses, detected in Ethernet packets received at any of the ELU Ethernet ports within the last srcAddressLifeGC seconds. Listing 6 shows a portion of the bridging function. Enque the source address and secondClock on the Maintain_CAM task

```
If (the destination address IS NOT in the CAM) {
        Send the packet upstream;
}
```

Listing 6

The ELU CAM can associate 16 bits of data with each 48 bit MAC address. Twelve of these bits are used to store the index of srcAddTblGV[], the location of the CAM data structure where the information on this particular MAC address is maintained. This task does not make any data integrity checks and so is independent as to which data should be used to resolve an integrity check.

Maintain_CAM

The queue of (source address, port) pairs that drive this task may be allowed to overrun. Items that are dropped due to this overrun typically reappear after a short time. Since this task runs at low priority, addresses do not expire exactly as required but remain in the CAM for a small but variable additional time.

The logic for this task is complex and the task has no interaction with the ELU hardware other than the CAM. This task uses the data redundancy between the CAM and the data structure used to maintain the CAM, to check for data and program logic consistency whenever it is easy to do so. Minor inconsistencies are recorded simply by stepping an appropriate counter. Major inconsistencies are enqueued for later processing by an exception analysis and recovery task. In general, the CAM data is considered the master set of information and the data structure is changed to be consistent with the contents of the CAM.

As used herein, a given signal, event or value is "responsive" or "in response to" a predecessor signal, event or value if the predecessor signal, event or value influenced the given signal, event or value. If there is an intervening processing element, step or time period, the given signal, event or value can still be "responsive" to the predecessor signal, event or value. If the intervening processing element or step combines more than one signal, event or value, the signal output of the processing element or step is considered "responsive" to each of the signal, event or value inputs. If the given signal, event or value is the same as the predecessor signal, event or value, this is merely a degenerate case in which the given signal, event or value is still considered to be "responsive" to the predecessor signal, event or value. "Dependency" of a given signal, event or value upon another signal, event or value is defined similarly.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. In particular, it will be obvious that the present invention may be employed in areas other than those related to Ethernet/ATM communications, i.e. to other forms of data communication that utilize bridging or half-bridging devices. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A method of creating an address table for a network bridging element bridging with a first sub-network, comprising the steps of:

in response to detection by said network bridging element of a packet on said first sub-network during a pre-designated address detection time window, recording in a permanent address table a source device address identified in said packet; and in response to detection by said network bridging element of a packet on said first sub-network outside of said pre-designated address detection time window, recording in a learned address table a source device address identified in said packet.

2. The method of claim 1 wherein the packet includes a destination device address identified in said packet.

3. The method of claim 1 wherein the packet is an Ethernet packet and the source device address is a media access control identifier contained within the Ethernet packet.

4. The method of claim 1 wherein the permanent address table is used to authorize devices on the sub-network to send packets across the network bridging element.

5. The method of claim 4 wherein only devices whose source device addresses are recorded in the permanent address table are allowed to send packets across the network bridging element.

6. The method of claim 1 wherein the network bridging element may operate in one of two operating modes, wherein a first operating mode is a provisioning mode and records source device address devices in the permanent table, and a second operating mode is a learning mode and records source device address in the learned table.

7. The method of claim 6 wherein the network bridging element operating mode may be switched by a remote operator via a signal command to the network bridging element.

8. The method of claim 2 further comprising the step of:

if the detected destination device for the packet already exists as a record in the permanent table then the packet is ignored.

9. The method according to claim 1 further comprising the step of recording in said permanent address table an explicitly provided device address not detected in said step of detecting.

10. The method of claim 2 further comprising the step of:

forwarding the packet across the network bridging element if the destination device address is not recorded in the permanent address table, and the source device address is recorded in the permanent address table.

11. The method of claim 2 further comprising the step of:

forwarding the packet across the network bridging element if the destination device address is not recorded in either the permanent address table or the learned address table, and the source device address is recorded in the permanent address table.

12. The method of claim 2 further comprising the step of:

discarding the packet if the destination device address is recorded in the permanent address table.

13. The method of claim 2 further comprising the step of:

discarding the packet if the destination device address is recorded in either the permanent address table or the learned address table.

14. The method of claim 2 further comprising the step of:

if in response to detection the source device address is not recorded in the learned address table, then creating a record for the source device address in the learned address table, together with an associated timer.

15. The method of claim 1 further comprising the step of:

if the source device address is already recorded in the learned address table then resetting a timer associated with the record for that source device address.

16. A method of creating an address table for a network bridging element bridging with a first sub-network, comprising the steps of:

in response to detection by said bridge of a packet on said first sub-network during a pre-designated address detection time window, recording in said address table without timeout a source device address identified in said packet; and in response to detection by said bridge of a packet on said first sub-network outside of said pre-designated address detection time window, recording in said address table with a timeout a source device address identified in said packet.

17. The method of claim 16 wherein the packet includes a destination device address identified in said packet.

18. The method of claim 16 wherein the packet is an Ethernet packet and the source device address is a media access control identifier contained within the Ethernet packet.

19. The method of claim 16 wherein the address table is used to authorize devices on the sub-network to send packets across the bridge.

20. The method of claim 19 wherein only devices whose source device addresses are recorded in the address table without timeout are allowed to send packets across the bridge.

21. The method of claim 16 wherein the bridge may operate in one of two operating modes, wherein a first operating mode is a provisioning mode and records source device address devices in the address table without timeout, and a second operating mode is a learning mode and record source device addresses in the address table with timeout.

22. The method of claim 21 wherein the bridge operating mode may be switched by a remote operator via a signal command to the bridge.

23. The method of claim 17 further comprising the step of:

if the detected destination device for the packet already exists as a record in the address table then the packet is ignored.

24. The method according to claim 16 further comprising the step of recording in said address table an explicitly provided device address not detected in said step of detecting.

25. The method of claim 17 further comprising the step of:

forwarding the packet across the bridge if the destination device address is not recorded in the address table, and the source device address is recorded in the address table without timeout.

26. The method of claim 17 further comprising the step of:

forwarding the packet across the bridge if the destination device address is not recorded in the address table without timeout and the source device address is recorded in the address table without timeout.

27. The method of claim 17 further comprising the step of:

discarding the packet if the destination device address is recorded in the address table.

28. The method of claim 17 further comprising the step of:
discarding the packet if the destination device address is recorded in the address table without timeout.

29. The method of claim 17 further comprising the step of:
if in response to detection outside of pre-designated address detection time window the source device address is not recorded in the address table, then creating a record for the source device address in the address table together with an associated timer.

30. The method of claim 16 further comprising the step of:
if the source device address is already recorded in the address table with timeout then resetting a timer associated with the record for that source device address.

31. A method of creating a provisioned address table for a bridging network element bridging with a first sub-network, comprising the steps of:
in response to detection by said bridge of a packet on said first sub-network during a pre-designated address detection time window, recording in said provisioned address table a source device address identified in said packet; and
leaving said provisioned address table unchanged in response to all detection by said bridge of packets on said first sub-network outside of any pre-designated address detection time window.

32. The method of claim 31 wherein the packet includes a destination device address identified in said packet.

33. The method of claim 31 wherein the packet is an Ethernet packet and the source device address is a media access control identifier contained within the Ethernet packet.

34. The method of claim 31 wherein the provisioned address table is used to authorize devices on the sub-network to send packets across the bridge.

35. The method of claim 34 wherein only devices whose source device addresses are recorded in the provisioned address table are allowed to send packets across the bridge.

36. The method of claim 31 wherein the bridge may operate in one of two operating modes, wherein a first operating mode is a provisioning mode and records source device address devices in the provisioned table and a second operating mode is a learning mode and does not record source device address devices in the provisioned table.

37. The method of claim 36 wherein the bridge operating mode may be switched by a remote operator via a signal command to the bridge.

38. The method of claim 32 further comprising the step of:
if the detected destination device for the packet already exists as a record in the provisioned table then the packet is ignored.

39. The method according to claim 31 further comprising the step of recording in said provisioned address table an explicitly provided device address not detected in said step of detecting.

40. The method of claim 32 further comprising the step of:
forwarding the packet via the bridge if the destination device address is not recorded in the provisioned address table, and the source device address is recorded in the provisioned address table.

41. The method of claim 32 further comprising the step of:
forwarding the packet via the bridge if the destination device address is not recorded in either the provisioned address table or the learned address table, and the source device address is recorded in the provisioned address table.

42. The method of claim 32 further comprising the step of:
discarding the packet if the destination device address is recorded in the provisioned address table.

43. The method of claim 32 further comprising the step of:
discarding the packet if the source device address is not recorded in the provisioned address table.

44. The method of claim 32 further comprising the step of:
if the source device address is not recorded in the address table then creating a record for the source device address in a separate address table together with an associated timer.

45. The method of claim 44 further comprising the step of:
if the source device address is already recorded in the learned address table then resetting a timer associated with the record for that source device address.

46. A method of maintaining an address table for a network element bridging with a first sub-network, comprising the steps of:
detecting a plurality of packets on said first sub-network, including at least one packet detected during a pre-designated address detection time window and at least one packet detected outside of all pre-designated address detection time windows;
recording in said address table a source device address identified in each of said detected packets; and
subsequently timing out of said address table each of said source device addresses except those which were identified in a packet detected during one of said pre-designated address detection time windows.

47. The method of claim 46 wherein the packet includes a destination device address identified in said packet.

48. The method of claim 46 wherein the packet is an Ethernet packet and the source device address is a media access control identifier contained within the Ethernet packet.

49. The method of claim 46 wherein the address table is used to authorize devices on the sub-network to send traffic across the bridge.

50. The method of claim 46 wherein only devices whose source device addresses are recorded in the address table during the pre-designated time window are allowed to forward packets across the bridge.

51. The method of claim 46 wherein the bridge may operate in one of two operating modes, wherein a first operating mode is a provisioning mode and records source device address devices in the table during the pre-designated time window and a second operating mode is a learning mode and does not record source device address in the table during the time window.

52. The method of claim 51 wherein the bridge operating mode may be switched by a remote operator via a signal command to the bridge.

53. The method of claim 47 further comprising the step of:
if the detected destination device for the packet already exists as a record in the address table then the packet is ignored.

54. The method according to claim 46 further comprising the step of recording in said address table an explicitly provided device address not detected in said step of detecting.

55. The method of claim 47 further comprising the step of:
forwarding the packet across the bridge if the destination device address is not recorded in the address table, and the source device address is recorded in the address table during the time window.

56. The method of claim 47 further comprising the step of:
forwarding the packet across the bridge if the destination device address is not recorded in the address table, and the source device address is recorded in the address table.

57. The method of claim 47 further comprising the step of:
discarding the packet if the destination device address is recorded in the address table.

58. The method of claim 46 further comprising the step of:
discarding the packet if the source device address is not recorded in the address table during the pre-designated time window.

59. The method of claim 47 further comprising the step of:
if the source device address is not recorded in the address table then creating a record for the source device address in the address table together with an associated timer.

60. The method of claim 48 further comprising the step of:
if the source device address is recorded in the learned address table then resetting a timer associated with the record for that source device address.

61. A method of bridging traffic between a first subnetwork and a remote network, comprising the steps of:
in response to detection by said bridge of a packet on said first sub-network during a pre-designated address detection time window, recording in a provisioned address table a source device address identified in said packet; and
in response to detection by said bridge of a packet on said first sub-network outside of said pre-designated address detection time window, recording in a learned address table a source device address identified in said packet.

62. The method of claim 61 wherein the packet includes a destination device address identified in said packet.

63. The method of claim 61 wherein the packet is an Ethernet packet and the source device address is a media access control identifier contained within the Ethernet packet.

64. The method of claim 61 wherein the provisioned address table is used to authorize devices on the sub-network to send traffic across the bridge.

65. The method of claim 64 wherein only devices whose source device addresses are recorded in the permanent address table are allowed to send traffic across the bridge.

66. The method of claim 61 wherein the bridge may operate in one of two operating modes, wherein a first operating mode is a provisioning mode and records source device address devices in the provisioned table and a second operating mode is a learning mode and records source device addresses in the learned table.

67. The method of claim 66 wherein the bridge operating mode may be switched by a remote operator via a signal command to the bridge.

68. The method of claim 62 further comprising the step of:
if the detected destination device for the packet already exists as a record in the provisioned table then the packet is ignored.

69. The method according to claim 61 further comprising the step of recording in said provisioned address table an explicitly provided device address not detected in said step of detecting.

70. The method of claim 62 further comprising the step of:
forwarding the packet if the destination device address is not recorded in the provisioned address table, and the source device address is recorded in the permanent address table.

71. The method of claim 62 further comprising the step of:
forwarding the packet if the destination device address is not recorded in either the provisioned address table or the learned address table, and the source device address is recorded in the provisioned address table.

72. The method of claim 62 further comprising the step of:
discarding the packet if the destination device address is recorded in the provisioned address table.

73. The method of claim 62 further comprising the step of:
discarding the packet if the destination device address is recorded either in the provisioned address table or the learned address table.

74. The method of claim 61 further comprising the step of:
if the source device address is not recorded in the learned address table then creating a record for the source device address in the learned address table, together with an associated timer.

75. The method of claim 61 further comprising the step of:
if the source device address is recorded in the learned address table then resetting a timer associated with the record for that source device address.

76. A method of secure bridging traffic between a first subnetwork and a remote network, comprising the steps of:
placing the bridge in a provisioning mode
recording in a provisioned address table a source device address identified in said packet in response to detection by said bridge of a packet on said first sub-network during a pre-designated address detection time window;
placing the bridge in a learning mode;
recording in a learned address table a source device address identified in said packet in response to detection by said bridge of a packet on said first sub-network outside of said pre-designated address detection time window, and
authorizing devices to send traffic via the bridge if the source device is recorded in the provisioned address table.

77. The method of claim 76 wherein the packet includes a destination device address identified in said packet.

78. The method of claim 76 wherein the packet is an Ethernet packet and the source device address is a media access control identifier contained within the Ethernet packet.

79. The method of claim 76 wherein the provisioned address table is used to authorize devices on the sub-network to send traffic across the bridge.

80. The method of claim 79 wherein only devices whose source device addresses are recorded in the provisioned address table are allowed to send traffic across the bridge.

81. The method of claim 76 wherein the bridge may operate in one of two operating modes, wherein a first operating mode is a provisioning mode and records source device address devices in the provisioned table and a second operating mode is a learning mode and record source device address devices in the table.

82. The method of claim 81 wherein the bridge operating mode may be switched by a remote operator via a signal command to the bridge.

83. The method of claim 77 further comprising the step of:
if the detected destination device for the packet already exists as a record in the provisioned table then the packet is ignored.

84. The method according to claim 76 further comprising the step of recording in said provisioned address table an explicitly provided device address not detected in said step of detecting.

85. The method of claim 77 further comprising the step of:
forwarding the packet if the destination device address is not recorded in the provisioned address table, and the source device address is recorded in the provisioned address table.

86. The method of claim 77 further comprising the step of:

forwarding the packet if the destination device address is not recorded in either the provisioned address table or the learned address table, and the source device address is recorded in the provisioned address table.

87. The method of claim 77 further comprising the step of:

discarding the packet if the destination device address is recorded in the provisioned address table.

88. The method of claim 77 further comprising the step of:

discarding the packet if the destination device address is recorded either in the provisioned address table or the learned address table.

89. The method of claim 76 further comprising the step of:

if the source device address is not recorded in the learned address table then creating a record for the source device address in the learned address table together with an associated timer.

90. The method of claim 76 further comprising the step of:

if the source device address is recorded in the learned address table to then resetting a timer associated with the record for that source device address.

91. A method of maintaining an address table for a network element bridging with a first sub-network, comprising the steps of:

detecting a plurality of packets on said first sub-network, including at least one packet detected during a pre-designated address detection time window and at least one packet detected outside of all pre-designated address detection time windows;

recording in said address table a source device address identified in each of said detected packets; and in response to detection of a further packet on said first sub-network, forwarding said further packet off said first sub-network if and only if the destination device address is not recorded in the address table, and the source device address is recorded in the address table during any of said pre-designated address detection time windows.

92. The method of claim 91 further comprising:

discarding the packet if the source device address is not recorded in the address table during any of said pre-designated address detection time windows.

* * * * *